United States Patent
Wang et al.

(10) Patent No.: US 12,019,272 B2
(45) Date of Patent: Jun. 25, 2024

(54) OPTICAL SPECTROMETER WITH HIGH-EFFICIENCY OPTICAL COUPLING

(71) Applicant: Oak Analytics Inc., Camarillo, CA (US)

(72) Inventors: Ruibo Wang, Camarillo, CA (US); James F. Gass, Camarillo, CA (US)

(73) Assignee: Oak Analytics Inc., Camarillo, CA (US)

( * ) Notice: Subject to any disclaimer, the term of this patent is extended or adjusted under 35 U.S.C. 154(b) by 98 days.

(21) Appl. No.: 17/713,770

(22) Filed: Apr. 5, 2022

(65) Prior Publication Data
US 2022/0326440 A1  Oct. 13, 2022

Related U.S. Application Data

(60) Provisional application No. 63/174,393, filed on Apr. 13, 2021, provisional application No. 63/174,398, filed on Apr. 13, 2021.

(51) Int. Cl.
*G02B 6/14* (2006.01)
*G01J 3/04* (2006.01)
*G01J 3/44* (2006.01)

(52) U.S. Cl.
CPC .............. *G02B 6/14* (2013.01); *G01J 3/04* (2013.01); *G01J 3/4412* (2013.01)

(58) Field of Classification Search
CPC ...... G01J 3/0208; G01J 3/0221; G01J 3/0237; G01J 3/024; G01J 3/04; G01J 3/4412; G02B 27/0994; G02B 6/14
See application file for complete search history.

(56) References Cited

U.S. PATENT DOCUMENTS

| | | | |
|---|---|---|---|
| 4,325,634 A * | 4/1982 | Tohyama | G01J 3/04 356/334 |
| 4,995,723 A | 2/1991 | Carlhoff et al. | |
| 5,223,986 A * | 6/1993 | Mayerjak | G02B 27/09 385/119 |
| 2010/0148083 A1* | 6/2010 | Brown | G01J 3/0291 356/325 |
| 2011/0106472 A1 | 5/2011 | Seo et al. | |
| 2014/0022414 A1 | 1/2014 | Bhatia et al. | |
| 2017/0276610 A1 | 9/2017 | Fujita et al. | |
| 2020/0069225 A1 | 3/2020 | Vizbaras et al. | |

(Continued)

OTHER PUBLICATIONS

Vuilleumier et al. ("Variable entrance slit system for precision spectrophotometers", Proceedings IEEE Micro Electro Mechanical Systems, 1995, pp. 181-185) (Year: 1995).*

*Primary Examiner* — Hina F Ayub
(74) *Attorney, Agent, or Firm* — Shun Yao; Yao Legal Services, Inc.

(57) ABSTRACT

One embodiment provides an optical spectrometer. The optical spectrometer can include a lens-and-filter system configured to collect light scattered from a sample, a spot converter configured to convert a substantially circular beam outputted from the lens-and-filter system into a substantially rectangular beam, and a slit comprising a rectangular aperture to allow a predetermined portion of the substantially rectangular beam to enter the rectangular aperture while blocking noise. The slit can further include at least one microelectromechanical systems (MEMS)-based movable structure configured to adjust a width of the rectangular aperture.

14 Claims, 10 Drawing Sheets

(56) References Cited

U.S. PATENT DOCUMENTS

2021/0033457 A1    2/2021  Khoury
2023/0218174 A1*   7/2023  Wilson ................ A61B 5/0075
                                                        356/301

* cited by examiner

OPTICAL SPECTROMETER WITH HIGH-EFFICIENCY OPTICAL COUPLING

RELATED APPLICATION

This application claims the benefit of U.S. Provisional Application No. 63/174,393, titled "VARIABLE-WIDTH SYMMETRIC SLIDING MEMS SLIT APERTURE," by inventors Ruibo Wang and James F. Gass, filed on 13 Apr. 2021, and U.S. Provisional Application No. 63/174,398, titled "SPECTROMETER FIBER INPUT ADAPTER," by inventors Ruibo Wang and James F. Gass, filed on 13 Apr. 2021, the disclosures of which are incorporated herein by reference in their entirety.

BACKGROUND

Field

This disclosure is generally related to optical spectrometers. More specifically, this disclosure is related to optical spectrometers with high-efficiency optical coupling by implementing a spot converter and an adjustable slit.

Related Art

Optical spectrometers that rely on the detection of reflected and scattered light to perform spectral analysis typically detect very weak signals. For example, a Raman spectrometer can use a laser beam to excite inelastic scattering (also known as Raman scattering) of photons, and the returning Raman scattered signal can be one million times weaker than the excitation source.

To reduce detection noise, a special filter (typically in the form of a slit) can be used in front of the dispersive-and-detection unit. The optical coupling at the slit can be important to ensure high sensitivity and high resolution of the spectrometer.

SUMMARY

One embodiment provides an optical spectrometer. The optical spectrometer can include a lens-and-filter system configured to collect light scattered from a sample, a spot converter configured to convert a substantially circular beam outputted from the lens-and-filter system into a substantially rectangular beam, and a slit comprising a rectangular aperture to allow a predetermined portion of the substantially rectangular beam to enter the rectangular aperture while blocking noise. The slit can further include at least one microelectromechanical systems (MEMS)-based movable structure configured to adjust a width of the rectangular aperture.

In a variation on this embodiment, the spot converter can include a light-in end with a circular cross section and a light-out end with a rectangular cross section.

In a further variation, a diameter of the circular cross section of the light-in end can be between 1 and 3 mm, a width of the rectangular cross section of the light-out end can be between 10 and 100 μm, and a height of the rectangular cross section of the light-out end can be between 3 and 10 mm.

In a further variation, a sidewall of the spot converter can include a continuously curved surface connecting the light-in and light-out ends, and a curvature of the curved surface can be determined to minimize transmission loss within the spot converter.

In a further variation, the sidewall of the spot converter comprises a highly reflective (HR) coating, and the light-in and/or light-out end can include an anti-reflective (AR) coating.

In a further variation, the light-out end can include a cylindrical lens surface.

In a further variation, the spot converter can include a core layer and a cladding layer, and a refractive index of the cladding layer can be smaller than a refractive index of the core layer.

In a further variation, the spot converter can include glass or plastic.

In a variation on this embodiment, the slit can include a pair of MEMS-based sliding structures positioned on opposite sides of the rectangular aperture.

In a further variation, the pair of MEMS-based sliding structures can be configured to move in a mirrored fashion to adjust the width of the rectangular aperture such that the movement does not disturb an optical path of the scattered light.

In a variation on this embodiment, the at least one MEMS-based movable structure can have a movement range between 0 and 250 μm.

In a variation on this embodiment, the width of the rectangular aperture is determined based on a desired spectral property of the optical spectrometer.

One embodiment provides a spot converter for application within an optical spectrometer. The spot converter can include a light-in end with a circular cross section configured to receive a substantially circular beam outputted from a lens-and-filter system of the spectrometer and a light-out end with a rectangular cross section configured to output a substantially rectangular beam to be coupled to a slit of the spectrometer.

In a variation on this embodiment, a sidewall of the spot converter can include a continuously curved surface connecting the light-in and light-out ends. A curvature of the curved surface can be determined to minimize transmission loss within the spot converter, the sidewall of the spot converter can include a highly reflective (HR) coating, and the light-in and/or light-out end can include an anti-reflective (AR) coating.

In a variation on this embodiment, the light-out end can include a cylindrical lens surface.

In a variation on this embodiment, the spot converter can include a core layer and a cladding layer, and a refractive index of the cladding layer is smaller than a refractive index of the core layer.

One embodiment provides a slit for application within an optical spectrometer. The slit can include a rectangular aperture to allow a predetermined portion of the substantially rectangular beam to enter the rectangular aperture while blocking noise and at least one microelectromechanical systems (MEMS)-based movable structure configured to adjust a width of the rectangular aperture.

In a variation on this embodiment, the slit can include a pair of MEMS-based sliding structures positioned on opposite sides of the rectangular aperture, and the pair of MEMS-based sliding structures can be configured to move in a mirrored fashion to adjust the width of the rectangular aperture such that the movement does not disturb an optical path of the optical spectrometer.

In a variation on this embodiment, the at least one MEMS-based movable structure can have a movement range between 0 and 250 μm.

In a variation on this embodiment, the width of the rectangular aperture can be determined based on a desired spectral property of the optical spectrometer.

BRIEF DESCRIPTION OF THE FIGURES

In the figures, like reference numerals refer to the same figure elements.

DETAILED DESCRIPTION

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown but is to be accorded the widest scope consistent with the principles and features disclosed herein.

Overview

Embodiments described herein solve the technical problem of providing high-efficiency optical coupling in Raman spectrometers. More specifically, the Raman spectrometer can include a spot converter positioned in front of a slit that can convert a circular or elliptical beam spot into a rectangular beam spot to improve optical coupling efficiency at the rectangular slit. In some embodiments, the spot converter can be axe-shaped and made of an optically transparent material (e.g., glass or certain types of plastic). More specifically, one end of the spot converter can have a circular-shaped cross section, whereas the other end can have a rectangular-shaped cross section, and the width of the spot converter can gradually increase from the circular-shaped end to the rectangular-shaped end. The length, curvatures of the end surfaces, and the curvature of the sidewall can be optimized to confine the light within the spot converter with a minimum loss. In one embodiment, the rectangular-shaped end can have a cylindrical convex shape, such that the divergence angle of light emitting from the rectangular-shaped end of the spot converter can be kept small to increase coupling between the emitted light and the slit. In addition to the spot converter, the Raman spectrometer can include a dynamic slit having a variable width. More specifically, the dynamic slit can vary its width in a symmetrical way such that the center line of the slit remains stationary when the slit walls move.

Raman Spectrometer with a Spot Converter

Figure 1:
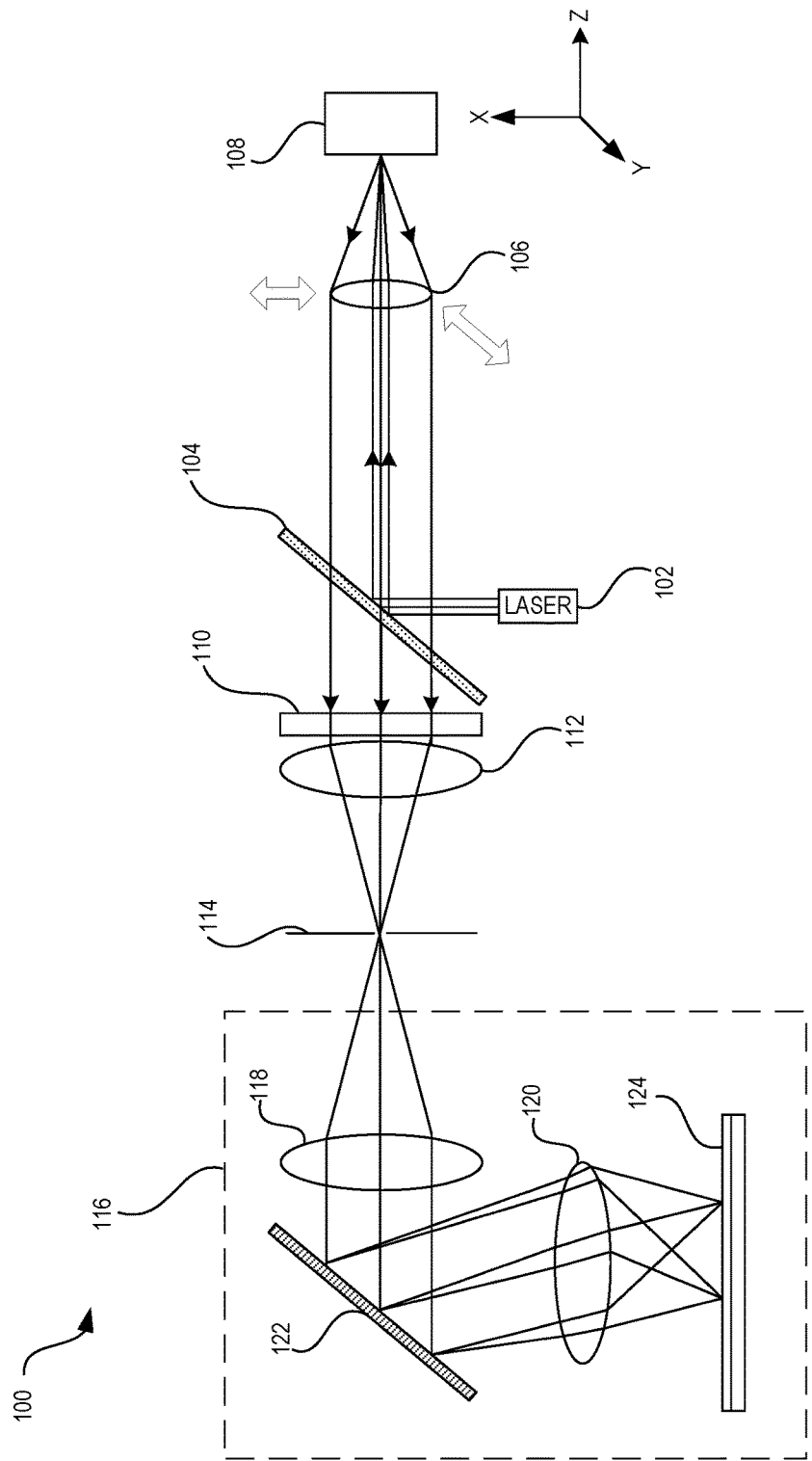
FIG. 1 illustrates an exemplary setup of a Raman spectrometer, according to one embodiment.

FIG. 1 illustrates an exemplary setup of a Raman spectrometer, according to one embodiment. Setup 100 can include an excitation source (e.g., a laser 102), a dichroic filter 104, an excitation lens 106, a sample 108, a longpass filter 110, a detection lens 112, a slit 114, and a dispersive-and-detection optical module 116.

During operation of the spectrometer, a laser beam emitted from laser 102 is reflected by dichroic filter 104 and then focused, along the Z axis, by excitation lens 106 onto the surface of sample 108. In some embodiments, excitation lens 106 can be configured to move in the X-Y plane (as indicated by the hollow double arrows), thus achieving a raster scan of the focused beam spot on the surface of sample 108. Implementing the raster scan using excitation lens 106 can prevent damage to the sample surface and increase the accuracy of the measurement. Detailed descriptions of implementing a moving lens system to achieve a raster scan can be found in U.S. application Ser. No. 17/681,537, titled "System and Method for Facilitating Optical Raster Scanning," by inventors Ruibo Wang and James F. Gass, filed on 25 Feb. 2022, the disclosure of which is incorporated herein by reference in its entirety. In situations where raster scan is not needed, excitation lens 106 can be fixed in position.

Excited Raman signals can be collected by excitation lens 106 and can pass through dichroic filter 104 and longpass filter 110 before being focused by detection lens 112. Unlike excitation lens 106, detection lens 112 remains stationary during operation of the spectrometer. Detection lens 112 focuses the Raman signals onto slit 114, which is placed in front of dispersive-and-detection optical module 116 to filter out environmental noise.

Dispersive-and-detection optical module 116 can facilitate spectra analysis on the Raman signals. In the example shown in FIG. 1, dispersive-and-detection optical module 116 can include lenses 118 and 120, a diffraction grating 122, and a detector array 124. Dispersive-and-detection optical module 116 may use other mechanisms for dispersing the Raman signals.

In a spectrometer similar to what is shown in FIG. 1, the slit plays an important role as the input window for the to-be-analyzed Raman scattered light. While the slit is a simple component with a simple geometry (e.g., a typical slit is rectangular), the dimension of the slit is one of the factors in determining the spectrometer's key performance parameters, such as resolution (or spectral resolution) and sensitivity. Although high resolution and high sensitivity are always desirable in high-performance spectrometers, there can be a trade-off between resolution and sensitivity. Usually, a narrower or smaller slit may result in higher resolution and lower light throughput, and hence a lower sensitivity. On the other hand, a wider or larger slit can have larger light throughput, and hence, higher sensitivity, but low resolution.

Compared with other types of apertures (e.g., a circular aperture), rectangular slits have been shown to be able to provide the highest resolution for a given amount of light. In addition, most optical sensors (e.g., detector array 124 shown in FIG. 1) use rectangular pixels. Therefore, a typical spectrometer will use a rectangular slit in front of its dispersive-and-detection optical module as a spatial filter. The height of a typical rectangular slit can be much larger than its width. This may create a problem for efficient coupling of the Raman light. Using FIG. 1 as an example, detection lens 112 (which is typically circular to maximize the collection of the scattered Raman light) may create a round beam spot with a diameter of 1 mm, whereas slit 114 may have a width of 0.1 mm. The mismatch in size and shape between slit 114 and the focused beam spot can result in more than 80 percent of the scattered Raman light power being blocked by slit 114.

Figure 2:
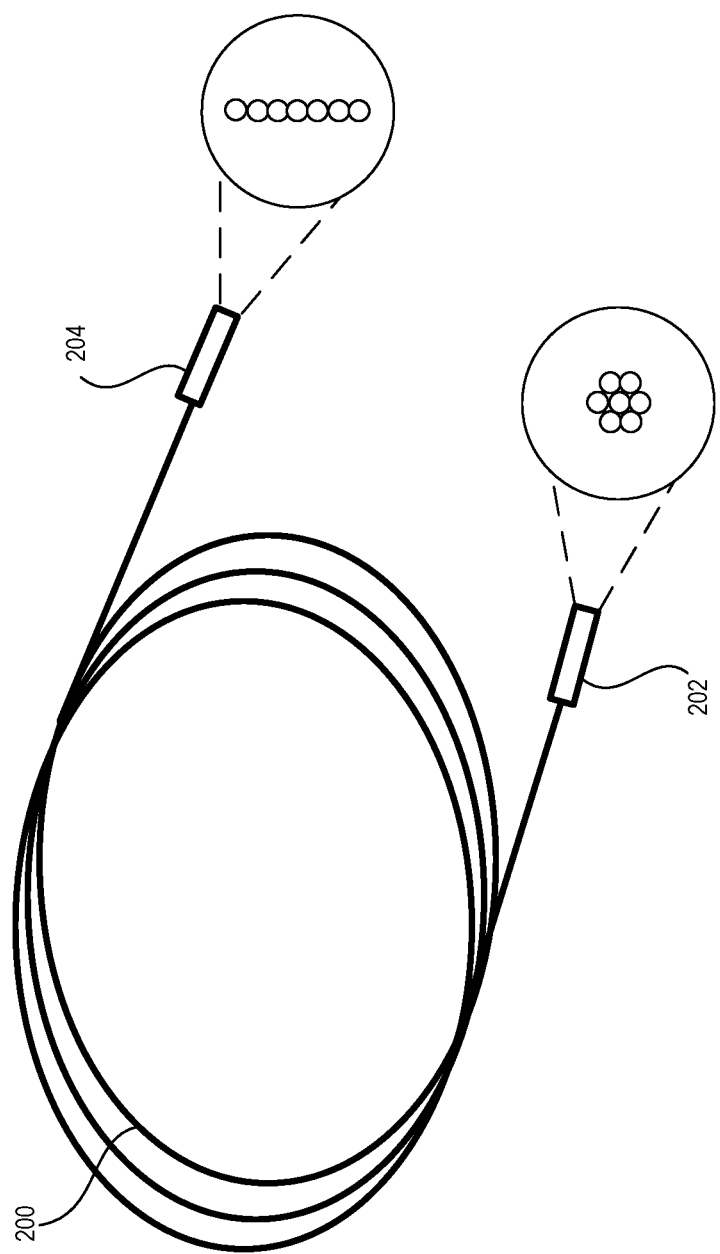
FIG. 2 illustrates a round-to-linear optical fiber bundle (prior art).

Different approaches have been used to improve the optical coupling at the slit. In certain situations, optical fiber bundles have been used to collect scattered Raman light, and a round-to-linear (also referred to as round-to-slit) fiber bundle cable (as shown in FIG. 2) can be used to convert a round beam spot into a linear configuration. In FIG. 2, an optical fiber bundle 200 can include multiple small core fibers (typically having a diameter of 100 µm) that are placed into one fiber assembly with fibers bundled tightly in a circular fashion on one end (i.e., circular end 202), and stacked linearly on top of each other on the other end (i.e., linear end 204). Circular end 202 can be used to collect the scattered Raman light, and linear end 204 can be placed in front of the rectangular slit. By stacking the fiber core linearly on top of each other, light exiting linear end 204 can better match the entrance slit of the spectrometer, thus improving the coupling efficiency at the slit. For example, if the fiber bundle has N fibers, the light captured by such a fiber bundle can be N-times larger than that of a single fiber.

Because a relatively large coupling loss may occur when optical signals are coupled from free space to a fiber or a fiber bundle, although the round-to-linear fiber bundle does help (via reshaping) the coupling at the rectangular slit, the large coupling loss at the fiber input may offset the benefit from the reshaping. Moreover, the complexity in fabrication of the round-to-linear fiber bundle introduces a high cost. A low-cost solution that can maximize both the coupling and reshaping is needed. In some embodiments, an easy to make, compact, and low-cost optical adapter or spot converter can be used to collect light from a circular area (e.g., at the focal point of a circular lens) and convert the circular beam into a substantially rectangular beam that matches the shape and size of the entrance slit of the dispersive-and-detection module of the spectrometer.

Figure 3:
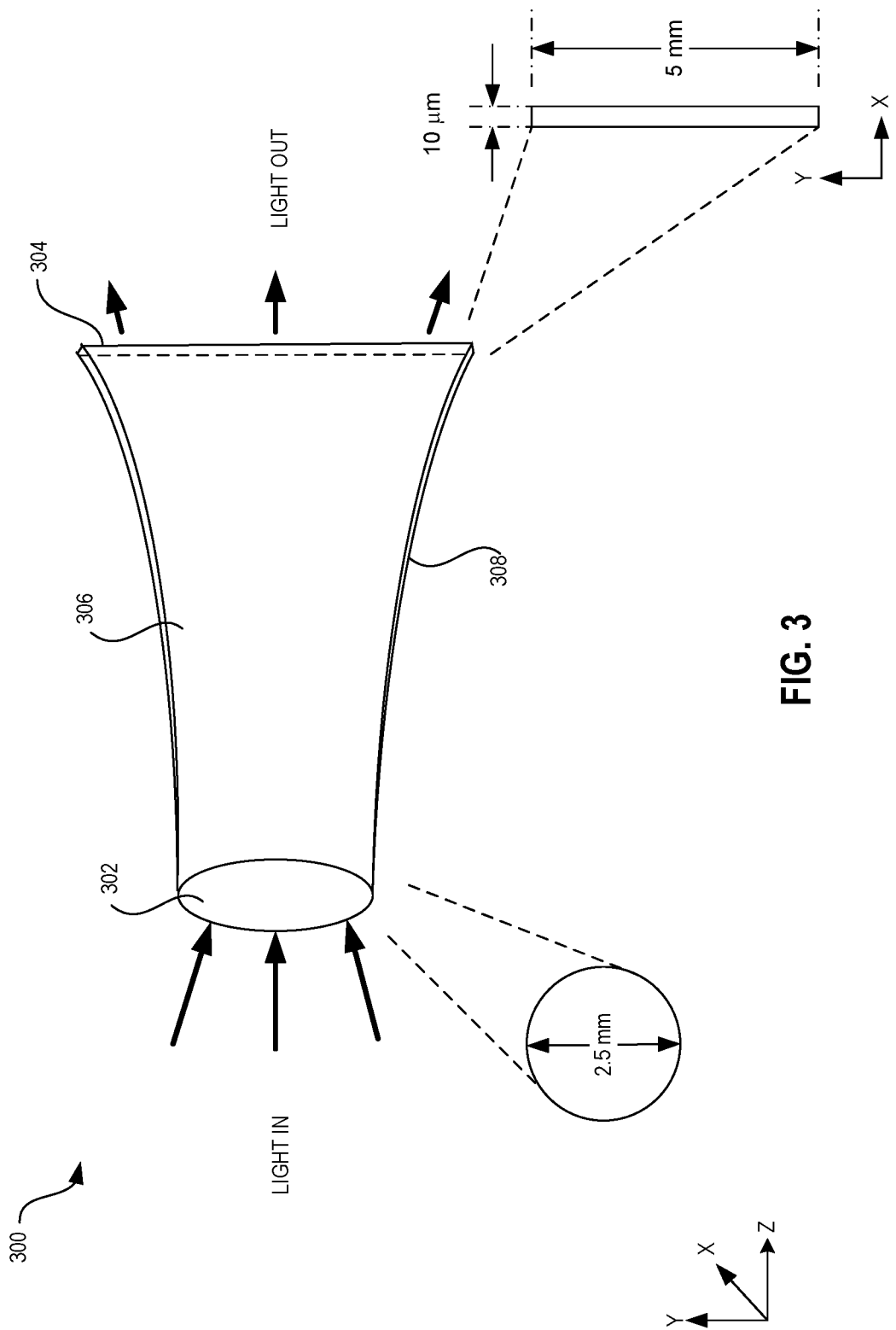
FIG. 3 illustrates an exemplary spot converter, according to one embodiment.

FIG. 3 illustrates an exemplary spot converter, according to one embodiment. Note that for simple illustration the coordination system used in FIG. 3 is a rotated version of the one used in FIG. 1. More specifically, the X-Y plane is rotated clockwise by 90°. Spot converter 300 can include a light-in end 302, a light-out end 304, and a body 306. As suggested by their names, light-in end 302 is where light enters spot converter 300, and light-out end 304 is where light exits spot converter 300. In some embodiments, the cross section of light-in end 302 can have a circular shape suitable for collecting light from a circular area, whereas the cross section of light-out end 304 can have a rectangular shape suitable for projecting light onto a rectangular slit.

In most cases, the height of the slit (i.e., along the X direction) is much larger than the diameter of the beam spot entering the slit, meaning that the diameter of light-in end 302 can be much smaller than the height of light-out end 304. On the other hand, the width (i.e., along the Y direction) of the slit can be much smaller than the diameter of the beam spot, meaning that the diameter of light-in end 302 can be much larger than the width of light-out end 304. FIG. 3 also shows the exemplary dimensions of the cross sections of light-in end 302 and light-out end 304. In this example, the diameter of the circular cross section of light-in end 302 can be about 2.5 mm, and the rectangular cross section of light-out end 304 can have a dimension of 10 µm×5 mm. In general, the diameter of the circular cross section of light-in end 302 can be between 1 and 3 mm, the width of the rectangular cross section of light-out end 304 can be between 10 µm and 100 µm, and the height of the rectangular cross section of light-out end 304 can be between 3 and 10 mm.

As one can see in FIG. 3, because the height of light-in end 302 is much smaller than the height of light-out end 304, the shape of spot converter 300 can be similar to that of an axe, with one end being shorter and fatter and the opposite end being taller and thinner. In some embodiments, the change (i.e., increase) in height from light-in end 302 to light-out end 304 can occur gradually. Similarly, the change (i.e., decrease) in width from light-in end 302 to light-out end 304 can also occur gradually. More specifically, the sidewall of spot converter 300 can be a continuous curved surface, and the curvature of the curved surface can be carefully designed to optimize the confinement of light (e.g., to minimize transmission loss) within spot converter 300. In some embodiments, a curve connecting a point on the perimeter of light-in end 302 to a corresponding point on the perimeter of light-out end 304 (e.g., curve 308) can be a hyperbolic curve, a parabolic curve, a part of a circle, a part of an ellipse, a polynomial curve, etc. Because the cross section along the length (i.e., the Z direction) of spot converter 300 changes gradually from circular to rectangular, optical modes of the light propagating along the length can also change gradually (e.g., from a circular mode to a rectangular mode), thus improving the coupling efficiency at the slit. To ensure that the height and/or width of spot converter changes gradually from light-in end 302 to light-out end 304, in some embodiments, at any given point on the sidewall of spot converter 300, the curvature of the curved surface is below a predetermined threshold.

In addition to controlling the curvature of the sidewall of spot converter 300, the curvature of each end may also be controlled to provide increased coupling. For example, light-in end 302 can have a convex surface to increase the light-collection efficiency. Similarly, to reduce the divergence angle of light exiting light-out end 304, the surface of light-out end 304 can have a cylindrical convex shape. Note that the length, the curvature of the sidewall, and the curvatures of the end surfaces of spot converter 300 should be carefully chosen to reduce propagation loss within spot converter 300 and to optimize the coupling efficiency between spot converter 300 and the slit.

To further improve the light confinement, a highly reflective (HR) coating can also be deposited onto the sidewall of spot converter 300 to reflect any strayed light back to spot converter 300. Examples of the HR coating can include metallic mirror coatings and multilayer dielectric HR coatings. In addition to HR coatings, in some embodiments, spot converter 300 can also use total-internal-reflection (TIR) to confine light within body 306. TIR takes place when the light propagating within spot converter 300 is incident onto its sidewall with an angle larger than the critical angle. The occurrence of TIR depends on two parameters, the surface profile spot converter 300 and the difference/distribution of the refractive index on the X-Y plane.

There are various approaches for fabricating the spot converter (also referred to as a mode converter). In some embodiments, the spot converter can be made of a glass or plastic (e.g., PMMA) material. One exemplary fabrication process starts with a glass rod, and through melting, drawing, hot pressing or molding, the glass rod can be flattened gradually from one end to the other end to form a shape similar to spot converter 300 shown in FIG. 3. Additional approaches for fabricating the spot converter can include but are not limited to: stamping, polishing, etching with post surface treatment, chemical vapor deposition (CVD), and 3D printing. Some of these approaches (e.g., 3D printing) may work better for plastic than glass, whereas some (e.g., etching) may work better for glass than plastic. Although CVD may be expensive, it may produce better results than other approaches.

Figure 4:
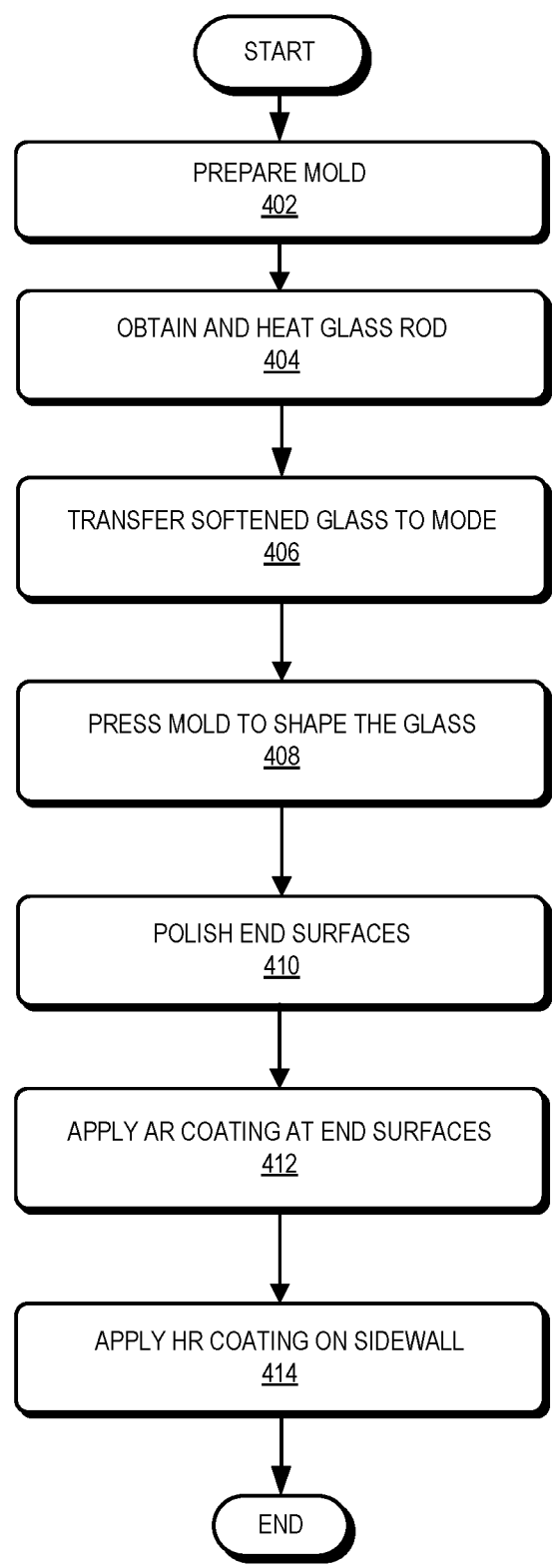
FIG. 4 presents a flowchart illustrating an exemplary process for fabricating a spot converter, according to one embodiment.

FIG. 4 presents a flowchart illustrating an exemplary process for fabricating a spot converter, according to one embodiment. During operation, a mold of a predetermined shape and dimension is prepared (operation 402). In some embodiments, the mold can be a metal mold. The shape and dimension of the mold can be determined based on various parameters of the spectrometer, including but not limited to the size of the slit, the focused beam spot, spatial constraints, etc. In one embodiment, the shape and dimension of the mold is determined to optimize the light-coupling efficiency at the slit. As shown in the example in FIG. 3, one end of the optical mode may have a round cross section, whereas the other end can have a rectangular cross section.

A piece of glass rod is obtained and heated to a temperature such that the glass is softened (operation 404). The softened glass can then be transferred to the mold, such as the bottom half of the mold (operation 406). The upper and lower halves of the mold can press together to shape the softened glass into the desired shape (operation 408).

Subsequently, the end surfaces, including surfaces on the light-in end and the light-out end can be polished to remove defects (operation 410), and an anti-reflective (AR) coating can be applied onto one or both of the end surfaces (operation 412). The AR coating can reduce reflection at the end surfaces, thus reducing light loss. The AR coating can include a single- or multi-layer coating. In addition, the sidewall can be coated with an HR coating or a cladding layer (operation 414). The HR coating can reduce light leakage through the sidewall.

In the example shown in FIG. 4, the spot converter is made from a glass rod. Considering that TIR can reduce the transmission loss within the body of the spot converter, it may be preferable to use a glass material with built-in TIR to fabricate the spot converter. For example, a gradient index (GRIN) lens can have a radially varying (e.g., gradient) refractive index. When the GRIN lens is molded into an axe shape similar to what is shown in FIG. 3, the resulting spot converter can have a radially varying refractive index (e.g., with higher index at the center and lower index at the edge), which can cause most light to be confined within its body. In addition to GRIN lenses, multimode optical fibers have a cladding layer and/or a graded index can also be used to fabricate the spot converter. Similar to the process shown in FIG. 4, the fabrication process can start with a cut piece of multimode optical fiber that can be heated and molded into the desired shape. In this way, the resulting spot converter can have a core layer and a cladding layer, with the cladding layer having a smaller refractive index than the core layer such that TIR may occur at the core/cladding interface to reduce transmission loss along the body of the spot converter.

Because the aspect ratio of the slit can be large, the aspect ratio of the light-out end of the spot converter also needs to be large. In the example shown in FIG. 3, the aspect ratio of light-out end 304 is 500. In other words, the light-out end has a very thin edge and the gradual transition from the light-in end to the light-out end can result in a long fragile piece of glass. Such a long thin piece of glass or plastic can be prone to breaking even with careful handling.

Figure 5:
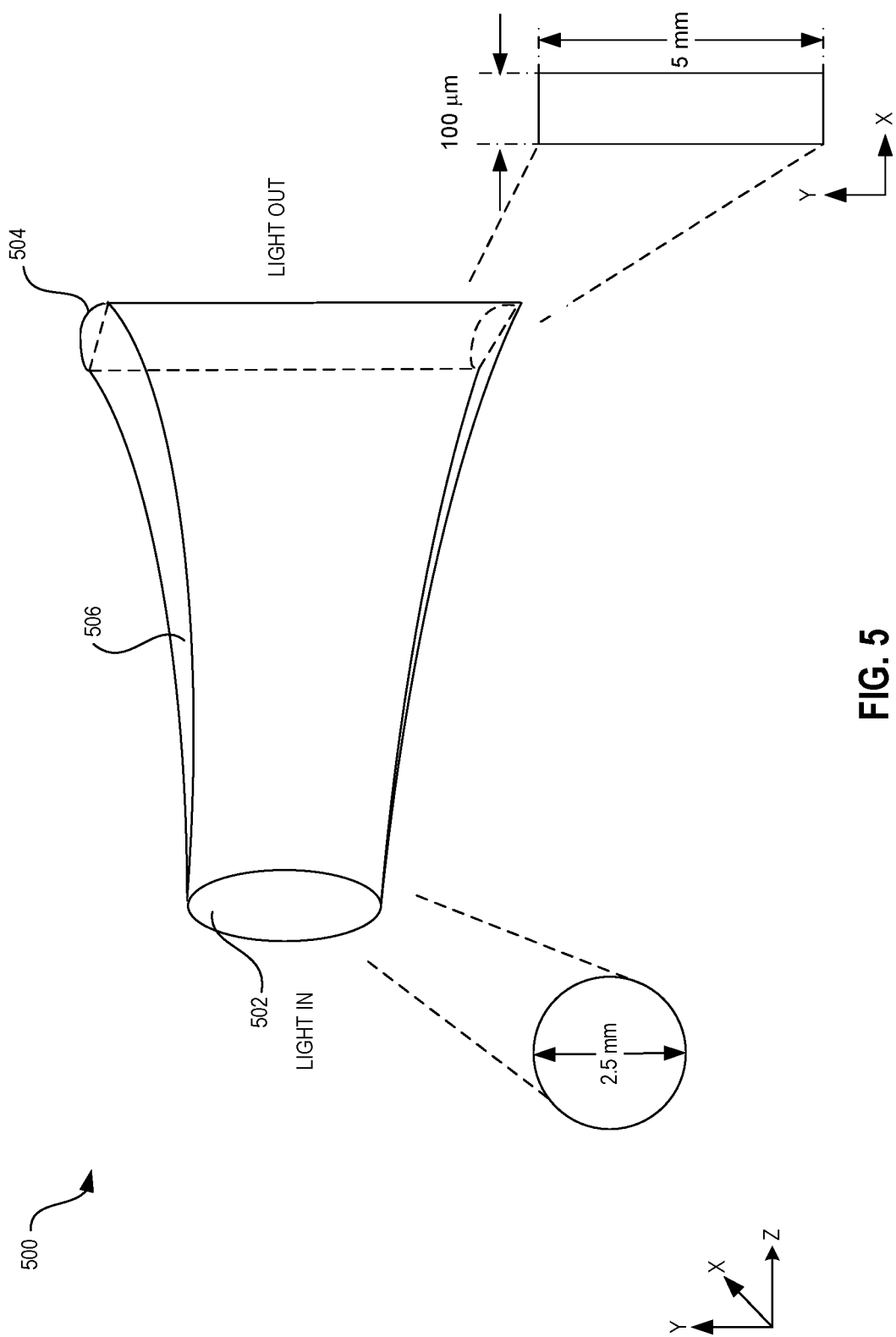
FIG. 5 illustrates an exemplary spot converter, according to one embodiment.

To overcome this challenge, the shape of the spot converter can be modified such that the light-out end can be widened (to 100 μm or larger). To improve the coupling between the widened light-out end and the thin (e.g., about 10 μm) slit, the surface of the light-out end can include a cylindrical lens surface. FIG. 5 illustrates an exemplary spot converter, according to one embodiment. Spot converter 500 can include a light-in end 502, a light-out end 504, and a body 506. Light-in end 502 can be similar in shape and in dimension to light-in end 302 shown in FIG. 3. However, light-out end 504 can be much wider than light-out end 304. FIG. 5 shows that the cross section of light-out end 504 can be a rectangle with a dimension of 100 μm×5 mm. Moreover, the light-emitter surface of light-out end 504 can be part of a cylinder. In other words, light-out end 504 include a cylindrical lens to focus the emitted light at the slit. The curvature of the cylindrical lens surface can be determined such that the optical coupling between light-out end 504 and the slit can be optimized.

The wider end also means that body 506 can be shorter compared with body 306. Wider and shorter spot converter 500 is more stable, thus allowing for relaxed handling requirements and longer life. In some embodiments, the width of the cross section of light-out end 504 can be up to 2 mm. In addition to being more robust, the wider spot converter also eases manufacturing requirements, allowing for more standard processes and tolerances to be used.

MEMS-Based Dynamic Aperture

Figure 6:
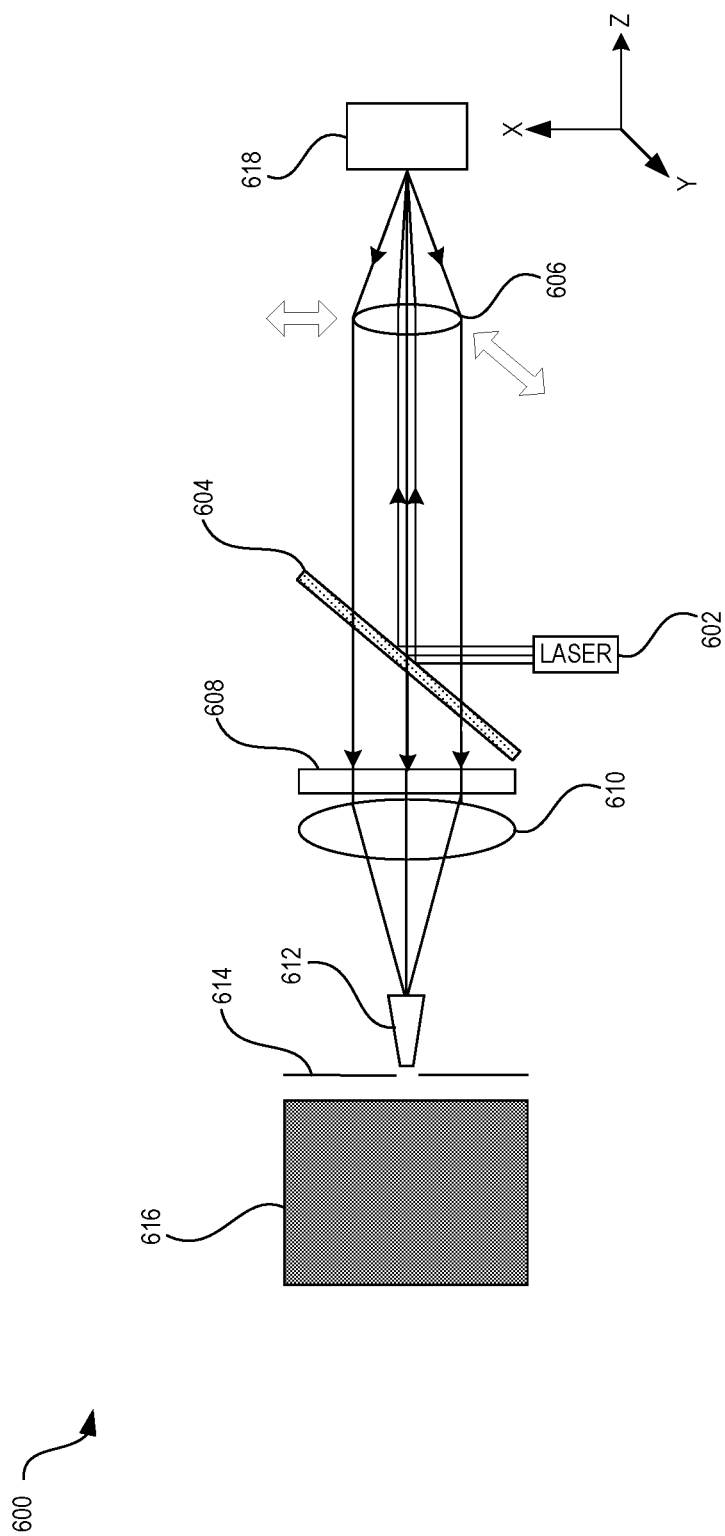
FIG. 6 illustrates an exemplary spectrometer, according to one embodiment.

FIG. 6 illustrates an exemplary spectrometer, according to one embodiment. Spectrometer 600 can include an excitation source (e.g., a laser 602), a dichroic filter 604, an excitation lens 606, a longpass filter 608, a detection lens 610, a spot converter 612, a slit 614, and a dispersive-and-detection optical module 616. Various components in FIG. 6 can be similar to those shown in FIG. 1. For example, laser 602 can emit a single-wavelength laser beam, which is reflected by dichroic filter 604 and then focused by excitation lens 606 onto the surface of sample 618. Excited light from sample 618 can be collected by excitation lens 606 (which can be a moving lens or a fixed lens) and can pass through dichroic filter 604 and longpass filter 608 before being focused by detection lens 610. Unlike what is shown in FIG. 1, the focused beam from detection lens 610 is not directly coupled to slit 614; instead, the focused beam is coupled into spot converter 612 (shown as projected onto the X-Z plane with a wider light-in end and a narrower light-out end), which converts the circular beam spot created by detection lens 610 to a substantially rectangular beam spot to increase the amount of light entering slit 614 such that a maximum amount of signal light can reach dispersive-and-detection optical module 616.

As discussed previously, the aperture size (e.g., the width) of slit 614 can determine the resolution and sensitivity of spectrometer 600. More specifically, the sensitivity can be directly proportional to the aperture size, whereas the resolution can be inversely proportional to the aperture size. Depending on the application (e.g., the type of sample being tested or the desired resolution/sensitivity), the trade-off between sensitivity and resolution can be optimized to obtain the most accurate test result. A particular type of material may have a "best case" aperture size that allows for an optimal blend of resolution and sensitivity. In addition, different resolution/sensitivity combinations may be desired for testing different properties of the same material. For example, when testing olive oil, a high-resolution Raman may provide information regarding where the olive oil was produced, whereas a lower resolution look at the florescence may give a better picture of whether the oil is spoiled. In situations where one is only interested in the appearance of a particular peak, it might be beneficial to lower the resolution and have a high success rate of peak identification rather than a more accurate placement of the peak from the higher resolution testing. Therefore, it is desirable to have the ability to adjust the aperture size of the spectrometer based on the type of sample being tested.

Some systems existing today solve this problem by offering interchangeable apertures of different sizes. However, there are several problems with this approach. First, it is undesirable to expose the internal optics of the spectrometer to any non-clean room environment. Dust and other contaminants can easily degrade the system performance and are difficult to remove. Second, apertures (e.g., slits) are very fragile. The openings in the apertures are typically very small (e.g., between 5 μm and 100 μm) and the material thickness can be equal or very close to the opening width. It is very easy to damage and/or dirty the apertures when replacing them. Third, the high fabrication and maintenance cost of the apertures can make it undesirable to have several apertures of different sizes (with increasingly small aperture sizes, cleaning becomes very difficult as dislodging even very small amounts of dust can deform the slit).

Although dynamic apertures have been used in cameras, such apertures are typically round to match the shape of typical camera lenses. Spectrometers tend to use a rectangular aperture (i.e., a slit), because most optical sensors use rectangular pixels, and a rectangular aperture or "slit" can distribute the spectral signal across the entire detector pixel (or several pixels with 2D arrays). In order to use a round aperture to achieve the same resolution as a rectangular aperture, the imaged spot size needs to be much smaller, requiring a more complicated light path or a smaller aperture.

In some embodiments, MEMS (microelectromechanical systems) technologies can be used to create a dynamic aperture (or a slit with an adjustable width). MEMS are tiny (e.g., micro- or even nano-scale) structures (often made of Si, although other materials are also possible) that produce a mechanical movement when voltage is applied (or vice-versa). MEMS are gaining widespread application in optics due to their reliability resulting from the semi-conductor process and their ease of use. Some common optical MEMS devices can include optical switches, MEMS mirrors for beam steering or digital light processing (DLP), and MEMS shutters.

Figure 7A:
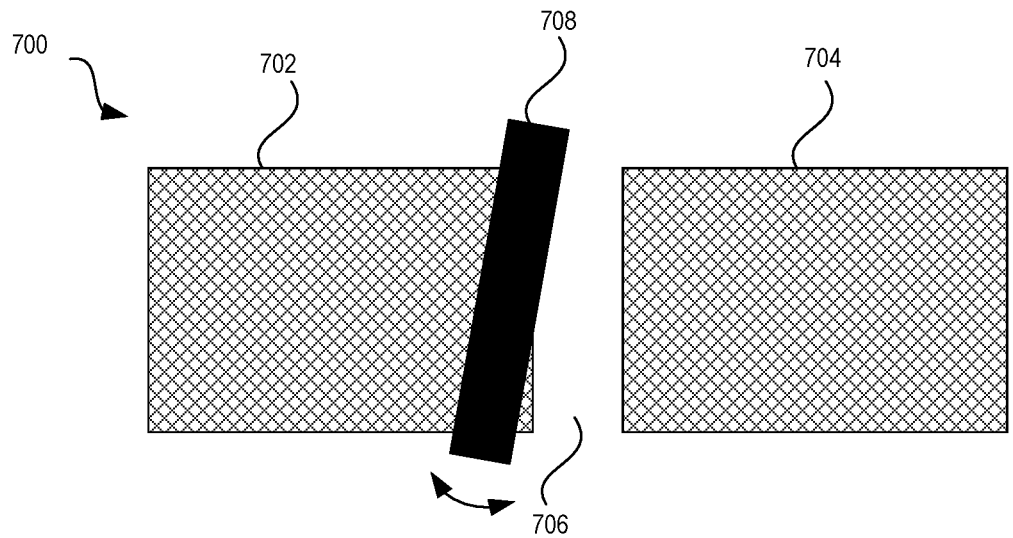
FIG. 7A illustrates an exemplary dynamic slit comprising a swinging MEMS shutter, according to one embodiment.

In some embodiments, a dynamic aperture or slit can implement the MEMS shutter technology. FIG. 7A illustrates an exemplary dynamic slit comprising a swinging MEMS shutter, according to one embodiment. A dynamic slit 700 can include a pair of light-blocking structures (e.g., walls) 702 and 704, with an aperture 706 defined by walls 702 and 704, and an opaque MEMS-based swinging paddle 708. Light-blocking structures (e.g., walls) 702 and 704 are fixed structures and remain stationary at all time. However, when a voltage is applied to MEMS swinging paddle 708, paddle 708 can swing, as shown by the double arrow, to block light entering aperture 706 partially or completely. The amount of light being blocked can depend on the angle of the paddle 708 (which is proportional to the voltage applied to the MEMS actuator moving paddle 708). Note that in addition to being part of the MEMS device, swinging paddle 708 can also be pushed by a MEMS actuator, such as a MEMS cantilever beam.

Hence, the size of aperture 706 can be dynamically adjusted by changing the amount of voltage applied to the MEMS actuator. If high sensitivity of the spectrometer is desired, a predetermined amount of voltage can be applied to ensure that aperture 706 has a maximum width and a maximum amount of light can pass through. On the other hand, if high resolution is desired, a different amount of voltage can be applied to reduce the amount of light passing through aperture 706. Although simple to implement, the swinging MEMS shutter shown in FIG. 7A may not be ideal for use as a dynamic aperture/slit in the spectrometer, because the paddle shape and angular movement do not create the desired image shape on the detector (e.g., detectors with rectangular pixels). In addition, the swinging configuration of the paddle also means that the change in sensitivity and/or resolution will not be linear or uniform across a given detector, thus adding further complexity to the calibration.

Figure 7B:
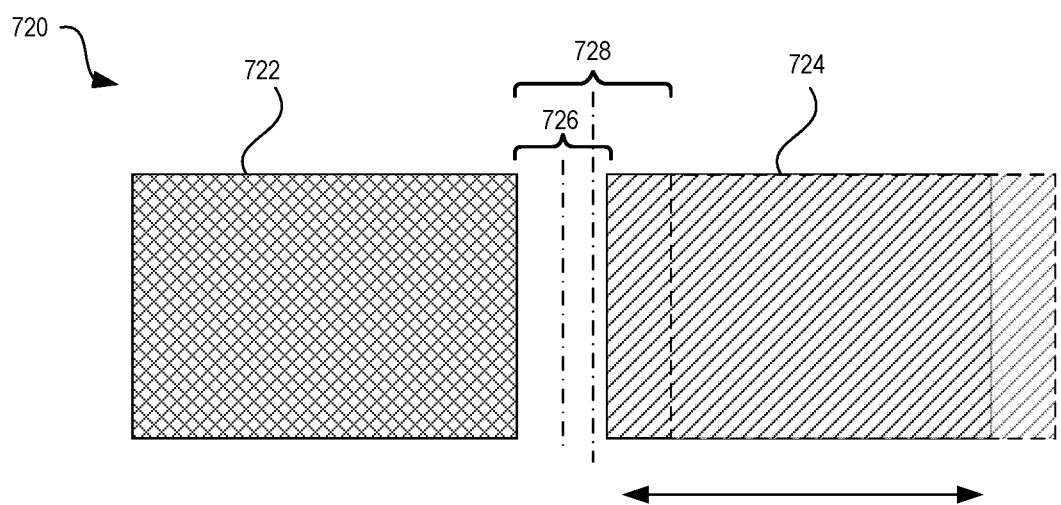
FIG. 7B illustrates an exemplary dynamic slit comprising a sliding MEMS shutter, according to one embodiment.

FIG. 7B illustrates an exemplary dynamic slit comprising a sliding MEMS shutter, according to one embodiment. A dynamic slit 720 can include a fixed light-blocking structure 722 and a MEMS-based sliding structure 724. In this example, the MEMS shutter acts like a sliding door, with fixed light-blocking structure 722 remaining stationary at all time while MEMS-based sliding structure 724 slides sideways (i.e., toward and away from fixed light-blocking structure 722, as shown by the double arrow) to adjust the width of the spacing between fixed light-blocking structure 722 and MEMS-based sliding structure 724.

In FIG. 7B, an aperture 726 is defined by structures 722 and 724 when sliding structure 724 is in a first position (indicated by a solid outline), and an aperture 728 is defined by structures 722 and 724 when sliding structure 724 is in a second position (indicated by a dashed outline). In some embodiments, sliding structure 724 can be part of a MEMS device and moves in response to an applied voltage or current. In alternative embodiments, sliding structure 724 may be actuated by a MEMS actuator. For example, MEMS-based sliding structure 724 can be mounted on a MEMS linear stage, similar to the MEMS linear stage disclosed in U.S. Pat. No. 7,265,476. Many different MEMS technologies, including but not limited to: electrostatic actuation, electrothermal actuation, piezoelectric actuation, etc., can be used to achieve the sliding MEMS shutter. The scope of this disclosure is not limited by the actual implementation of the sliding MEMS shutter.

Compared with the swinging MEMS shutter shown in FIG. 7A, the sliding MEMS shutter shown in FIG. 7B can provide linearity in changes of the slit width (e.g., as a function of the applied voltage). However, the linear change in the aperture size may not result in linear changes in sensitivity and/or resolution of the spectrometer. This is because the movement of sliding structure 724 effectively shifts the aperture center and thus changes the light path. As shown in FIG. 7B, centers of apertures 726 and 728 are located at different positions. In spectrometers the shifting aperture center will lead to an undesired shift in the spectrum, causing the spectrometer to lose calibration.

To implement a dynamic aperture/slit without the aforementioned problems, in some embodiments, a symmetric slit can be implemented where the aperture center remains in position when the aperture varies its size. More specifically, the symmetric slit can have the light-blocking structures on both sides of the aperture move in a substantially symmetric and mirrored manner (i.e., the movement of one side mirrors the movement of the other side).

Figure 8:
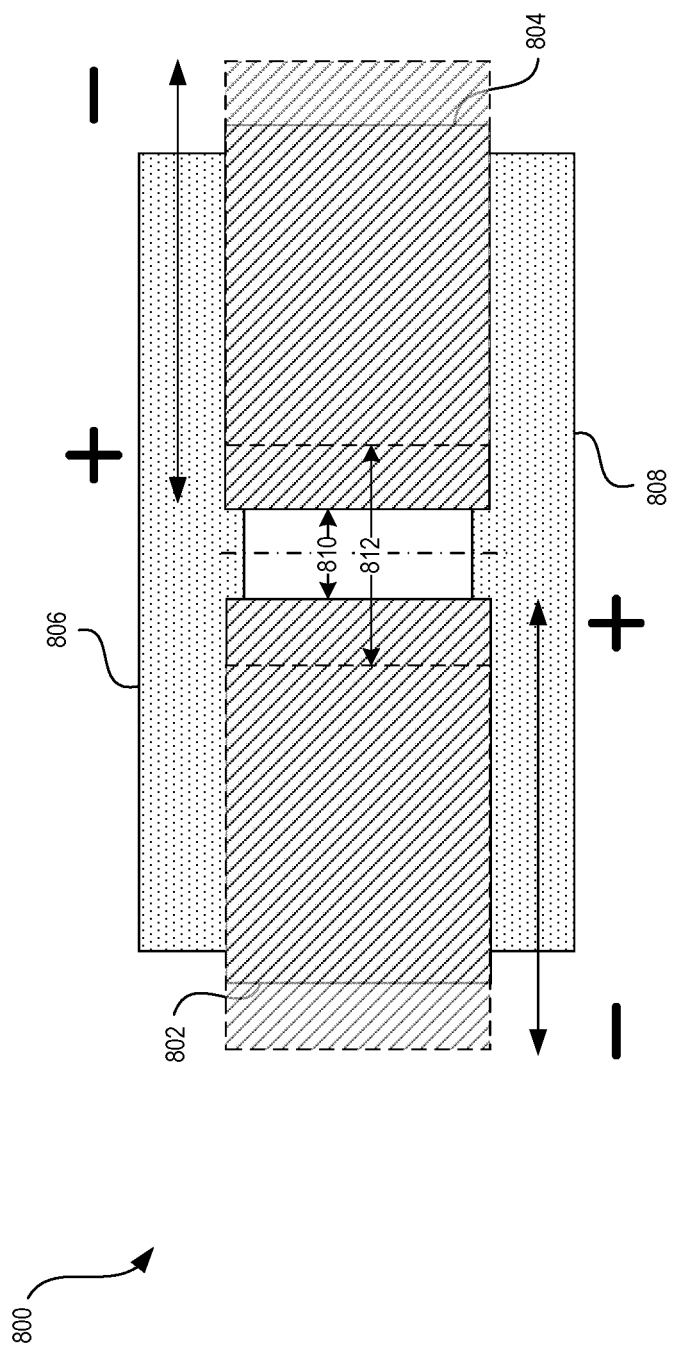
FIG. 8 illustrates an exemplary symmetric MEMS slit, according to one embodiment.

FIG. 8 illustrates an exemplary symmetric MEMS slit, according to one embodiment. Symmetric MEMS slit 800 can include a pair of MEMS-based sliding structures 802 and 804 and a pair of MEMS control modules 806 and 808. Each of the MEMS-based sliding structures 802 and 804 can be similar to MEMS-based sliding structure 724 shown in FIG. 7B and can slide sideways to adjust the width of the spacing between them.

MEMS-based sliding structures 802 and 804 can be similar such that, when the same amount of voltage is applied, each structure can move a similar distance in opposite directions, such that the center line of an aperture formed by structures 802 and 804 remains unchanged. For example, when no voltage is applied, MEMS-based sliding structures 802 and 804 may form an aperture 810; and when a same amount of voltage is applied to each structure, MEMS-based sliding structures 802 and 804 may slide away from each other by a similar distance, forming an aperture 812. Because MEMS-based sliding structures 802 and 804 move in sync and in symmetry, the symmetric centers of apertures 810 and 812 overlap. This way, movements of sliding structures 802 and 804 do not shift the aperture center and the light path remains undisturbed.

Note that MEMS-based sliding structures 802 and 804 should be constructed carefully such that they are in the same plane, and their movement should also be confined into the same plane (e.g., no tilting). Moreover, MEMS-based sliding structures 802 and 804 are opaque and sufficiently thin to prevent loss in transmission efficiency. In some embodiments, MEMS-based sliding structures 802 and 804 should have a thickness no larger than three times the minimum desired aperture width (e.g., 10 μm). In one embodiment, MEMS-based sliding structures 802 and 804 should have a thickness similar to the minimum aperture width. Si-based MEMS devices are typically opaque and can easily meet the thickness requirements.

In some embodiments, MEMS-based sliding structures 802 and 804 can include two separate MEMS devices that are individually controlled by MEMS control modules 808 and 806, respectively. More specifically, MEMS control modules 808 and 806 can operate in a synchronized and symmetrical fashion to apply a similar amount of voltage to MEMS-based sliding structures 802 and 804. In alternative embodiments, MEMS-based sliding structures 802 and 804 can belong to a single MEMS device that has two symmetrical and mirrored units. In such a case, only one MEMS controller module is needed. The single MEMS controller module can simultaneously apply the same amount of voltage to MEMS-based sliding structures 802 and 804, causing MEMS-based sliding structures 802 and 804 to move in opposite directions.

In some embodiments, each sliding structure can have a movement range between 0 and 100 μm, resulting in a slit width variation range of up to 200 μm. In alternative embodiments, when the sliding structures are placed on MEMS linear stages, each can have a movement range of up to 250 μm. The size of each MEMS-based sliding structure can be determined based on the spectrometer design (e.g., the size of the spot converter). For example, each sliding structure can have a height of 5 mm, similar to the height of spot converter 302 shown in FIG. 3. As discussed previously, many different MEMS technologies, including but not limited to: electrostatic actuation, electrothermal actuation, piezoelectric actuation, etc., can be used to construct the sliding structures in symmetric MEMS slit 800. The scope of this disclosure is not limited by the actual implementation of the sliding structures.

Figure 9:
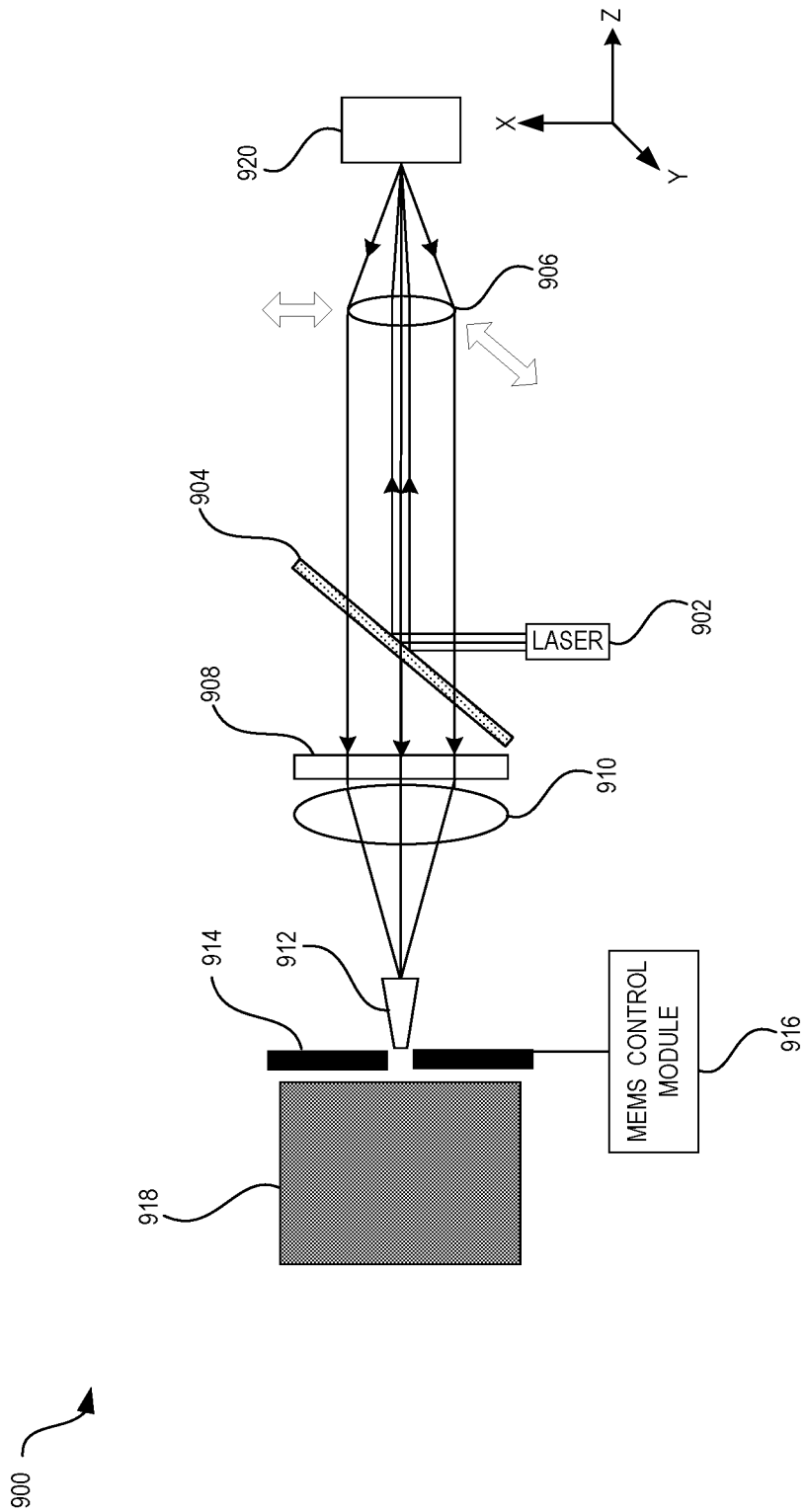
FIG. 9 illustrates an exemplary spectrometer, according to one embodiment.

FIG. 9 illustrates an exemplary spectrometer, according to one embodiment. Spectrometer 900 can include an excitation source (e.g., a laser 902), a dichroic filter 904, an excitation lens 906, a longpass filter 908, a detection lens 910, a spot converter 912, a MEMS-based slit 914, a MEMS control module 916, and a dispersive-and-detection optical module 918. Various components in FIG. 9 can be similar to those shown in FIG. 1 and FIG. 6.

In FIG. 9, laser 902 can emit a single-wavelength laser beam, which is reflected by dichroic filter 904 and then focused by excitation lens 906 onto the surface of sample 920. Excited light from sample 920 can be collected by excitation lens 906 and can pass through dichroic filter 904 and longpass filter 908 before being focused by detection lens 910. Spot converter 912 converts the circular beam spot created by detection lens 910 to a substantially rectangular beam spot to increase the amount of light entering MEMS-based slit 914 such that a maximum amount of signal light can reach dispersive-and-detection optical module 918.

MEMS-based slit 914 can include one or two moving structures. In some embodiments, MEMS-based slit 914 can include a MEMS swinging paddle that can partially block light entering slit 914. In some embodiments, MEMS-based slit 914 can include a MEMS-based sliding structure that can slide toward or away from a fixed structure on the opposite side to adjust the width of MEMS-based slit 914. In some embodiments, MEMS-based slit 914 can include a pair of MEMS-based sliding structures that can slide toward or away from each other in a synchronized and symmetrical fashion to adjust the aperture width of MEMS-based slit 914 without changing the position of the center line of the aperture. This way, the optical path is not disturbed by the movement of the MEMS-based sliding structures, and there is no need to recalibrate the spectrometer after moving the sliding structures. MEMS control module 916 controls the movement of the MEMS device(s) included in MEMS-based slit 914. For example, MEMS control module 916 can apply an appropriate amount of voltage to the MEMS device(s), causing the width of MEMS-based slit 914 to be adjusted. In one embodiment, MEMS control module 916 can receive a user input and control the MEMS device(s) accordingly.

Figure 10:
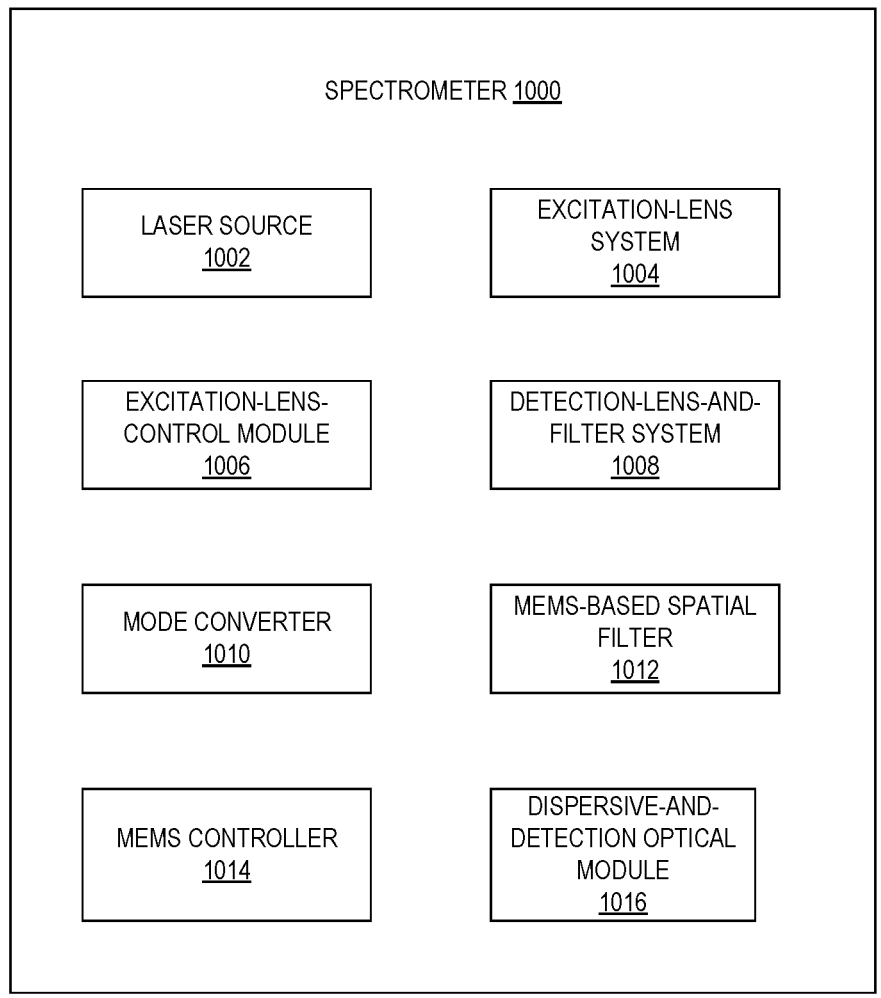
FIG. 10 illustrates a block diagram of a spectrometer, according to one embodiment.

FIG. 10 illustrates a block diagram of a spectrometer, according to one embodiment. Spectrometer 1000 can include a laser source 1002, an excitation-lens system 1004, an excitation-lens-control module 1006, a detection-lens-and-filter system 1008, a mode converter 1010, a MEMS-based spatial filter 1012, a MEMS controller 1014, and a dispersive-and-detection optical module 1016.

Laser source 1002 can be responsible for providing high-intensity excitation light to be shone on a sample. Excitation-lens system 1004 can be responsible for focusing the excitation light and performing raster scanning (when needed) on the sample surface. Excitation-lens-control module 1006 controls the movement (e.g., range and frequency) of the excitation lens. In situations where raster scan is not needed, excitation-lens system 1004 can include a fixed lens. Detection-lens-and-filter system 1008 can include a number of stationary optical components, such as a dichroic filter, a longpass filter and a lens.

Mode converter 1010 can convert the optical mode excited by detection-lens-and-filter system 1008 (e.g., a mode with a circular symmetry) to an optical mode with a substantially rectangular symmetry. MEMS-based spatial filter 1012 can include one or more MEMS-based movable structures that can move in response to an applied voltage/current signal in order to adjust the width of an aperture to achieve a predetermined sensitivity and/or resolution of spectrometer 1000. In some embodiments, the combination of sensitivity and resolution of spectrometer 1000 can be optimized based on the desired spectral properties (e.g., high resolution or high throughput). MEMS controller 1014 controls the movement of the MEMS device(s). In some embodiments, MEMS controller 1014 can receive an input command from a user, which may specify an aperture size. In response, MEMS controller 1014 can calculate the amount of voltage to be applied to the MEMS device(s) and then apply the calculated voltage in order to achieve the desired aperture size. Alternatively, the user input may specify the voltage amount directly. Dispersive-and-detection optical module 1016 receives and detects the light passing through MEMS-based spatial filter 1012.

In general, the disclosed embodiments provide a spectrometer with a spot converter providing improved light-coupling efficiency and a dynamic slit providing an optimized combination of sensitivity and resolution. More specifically, the spot converter can include a piece of optically transparent material (e.g., glass or plastic) molded into an axe shape, with the light-in end having a circular cross section and the light-out end having a rectangular cross section. The dimension of the light-out end can be designed to substantially match the dimension of a rectangular slit, thus increasing the light-coupling efficiency at the slit. To relax the requirement of the thickness of the light-out end, in some embodiments, the thickness of the light-out end can be much larger (e.g., about 10 times) than the width of the slit, and the light-out end can include a cylindrical lens surface to allow light exiting the light-out end of the spot converter to be focused on the narrow slit. In some embodiments, the width of the slit can be adjusted based on the type of sample or material under testing. In some embodiments, the slit can include one or more MEMS-based movable structures. In one embodiment, the slit can include a pair of MEMS-based sliding structures that slide in a synchronized and symmetrical manner to adjust the size of an aperture defined by these sliding structures without affecting the line of symmetry of the aperture, thus preventing the need to recalibrate the spectrometer.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An optical spectrometer, comprising:
   a lens-and-filter system configured to collect light scattered from a sample;
   a spot converter configured to convert a substantially circular beam outputted from the lens-and-filter system into a substantially rectangular beam, wherein the spot converter comprises a glass rod molded into an axe shape having a light-in end with a circular cross section and a light-out end with a rectangular cross section; and
   a slit comprising a rectangular aperture to allow a predetermined portion of the substantially rectangular beam to enter the rectangular aperture while blocking noise, wherein the slit comprises at least one microelectromechanical systems (MEMS)-based movable structure configured to adjust a width of the rectangular aperture.

2. The optical spectrometer of claim 1, wherein a diameter of the circular cross section of the light-in end is between 1 and 3 mm, wherein a width of the rectangular cross section of the light-out end is between 10 and 100 μm, and wherein a height of the rectangular cross section of the light-out end is between 3 and 10 mm.

3. The optical spectrometer of claim 1, wherein a sidewall of the spot converter comprises a continuously curved surface connecting the light-in and light-out ends, and wherein a curvature of the curved surface is determined to minimize transmission loss within the spot converter.

4. The optical spectrometer of claim 3, wherein the sidewall of the spot converter comprises a highly reflective (HR) coating, and wherein the light-in and/or light-out end comprises an anti-reflective (AR) coating.

5. The optical spectrometer of claim 1, wherein the light-out end comprises a cylindrical lens surface.

6. The optical spectrometer of claim 1, wherein the spot converter comprises a core layer and a cladding layer, and wherein a refractive index of the cladding layer is smaller than a refractive index of the core layer.

7. The optical spectrometer of claim 1, wherein the slit comprises a pair of MEMS-based sliding structures positioned on opposite sides of the rectangular aperture.

8. The optical spectrometer of claim 7, wherein the pair of MEMS-based sliding structures are configured to move in a mirrored fashion to adjust the width of the rectangular aperture such that the movement does not disturb an optical path of the scattered light.

9. The optical spectrometer of claim 1, wherein the at least one MEMS-based movable structure has a movement range between 0 and 250 μM.

10. The optical spectrometer of claim 1, wherein the width of the rectangular aperture is determined based on a desired spectral property of the optical spectrometer.

11. A spot converter for application within an optical spectrometer, comprising:
    a glass rod molded into an axe shape with a shorter first end and a taller second end;
    wherein the shorter first end comprises a circular cross section configured to receive a substantially circular beam outputted from a lens-and-filter system of the spectrometer; and
    wherein the taller second end comprises a rectangular cross section configured to output a substantially rectangular beam to be coupled to a slit of the spectrometer.

12. The spot converter of claim 11, wherein a sidewall of the spot converter comprises a continuously curved surface connecting the light-in and light-out ends, wherein a curvature of the curved surface is determined to minimize transmission loss within the spot converter, wherein the sidewall of the spot converter comprises a highly reflective (HR) coating, and wherein the light-in and/or light-out end comprises an anti-reflective (AR) coating.

13. The spot converter of claim 11, wherein the taller second end comprises a cylindrical lens surface.

14. The spot converter of claim 11, wherein the spot converter comprises a core layer and a cladding layer, wherein a refractive index of the cladding layer is smaller than a refractive index of the core layer.

* * * * *